United States Patent
Martinez Sancho

(10) Patent No.: US 11,772,800 B2
(45) Date of Patent: Oct. 3, 2023

(54) VEHICLE CABIN AIR SUPPLY DEVICE AND OPERATING METHOD OF SUCH DEVICE

(71) Applicant: Airbus Operations S.L., Getafe (ES)

(72) Inventor: Alberto Martinez Sancho, Getafe (ES)

(73) Assignee: AIRBUS OPERATIONS S.L., Getafe (ES)

(*) Notice: Subject to any disclaimer, the term of this patent is extended or adjusted under 35 U.S.C. 154(b) by 313 days.

(21) Appl. No.: 17/188,115

(22) Filed: Mar. 1, 2021

(65) Prior Publication Data

US 2021/0284344 A1  Sep. 16, 2021

(30) Foreign Application Priority Data

Mar. 12, 2020 (EP) .................................. 20382180

(51) Int. Cl.
*B64D 13/00* (2006.01)
*B64D 13/06* (2006.01)

(52) U.S. Cl.
CPC ...... *B64D 13/06* (2013.01); *B64D 2013/0611* (2013.01); *B64D 2013/0651* (2013.01)

(58) Field of Classification Search
USPC .................................................... 454/69–165
See application file for complete search history.

(56) References Cited

U.S. PATENT DOCUMENTS

| 5,086,622 | A | * | 2/1992 | Warner | B64D 13/06 62/88 |
| 5,634,964 | A | | 6/1997 | Army, Jr. et al. | |
| 5,695,396 | A | * | 12/1997 | Markwart | B64D 13/00 454/71 |
| 5,725,048 | A | | 3/1998 | Burk et al. | |
| 2006/0021356 | A1 | | 2/2006 | Milde et al. | |
| 2011/0165830 | A1 | * | 7/2011 | Smith | B60H 1/00278 454/75 |
| 2016/0082809 | A1 | * | 3/2016 | Wang | B60H 1/248 454/145 |
| 2016/0355270 | A1 | * | 12/2016 | Bruno | B64D 13/02 |
| 2017/0106985 | A1 | * | 4/2017 | Stieger | B64D 13/02 |
| 2018/0147514 | A1 | | 5/2018 | Harke et al. | |
| 2018/0148183 | A1 | * | 5/2018 | Golle | B64D 13/06 |
| 2018/0237144 | A1 | * | 8/2018 | Bruno | B64D 13/04 |
| 2019/0383220 | A1 | * | 12/2019 | Mackin | F02C 9/18 |
| 2020/0217326 | A1 | * | 7/2020 | DeFrancesco | F01D 5/048 |
| 2020/0255152 | A1 | * | 8/2020 | Vignali | B64D 13/02 |

FOREIGN PATENT DOCUMENTS

| DE | 3509767 A1 | 1/1986 |
| EP | 1621243 A1 | 2/2006 |
| WO | 9625329 A1 | 8/1996 |
| WO | 2018189487 A1 | 10/2018 |

OTHER PUBLICATIONS

European Search Report; priority document.

* cited by examiner

*Primary Examiner* — Ko-Wei Lin
(74) *Attorney, Agent, or Firm* — Greer, Burns & Crain, Ltd.

(57) ABSTRACT

An operating method of a vehicle cabin air supply device comprising taking fresh air from outside the cabin, diverting the fresh air to an air exhaust during an exhaust duration period after starting the air supply device, before injecting the fresh air into the cabin, such that the fresh air injected in the cabin after the exhaust duration period minimizes unpleasant odors in the cabin. A vehicle cabin air supply device and an aircraft comprising such a device is also provided.

13 Claims, 3 Drawing Sheets

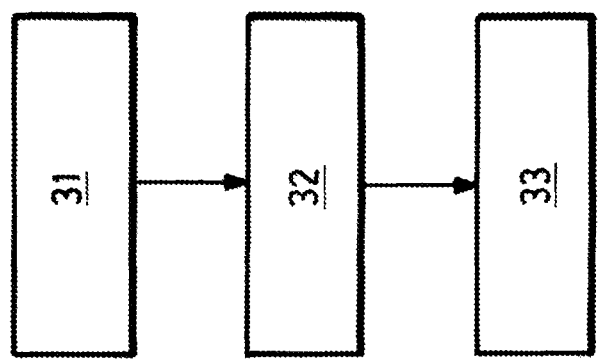
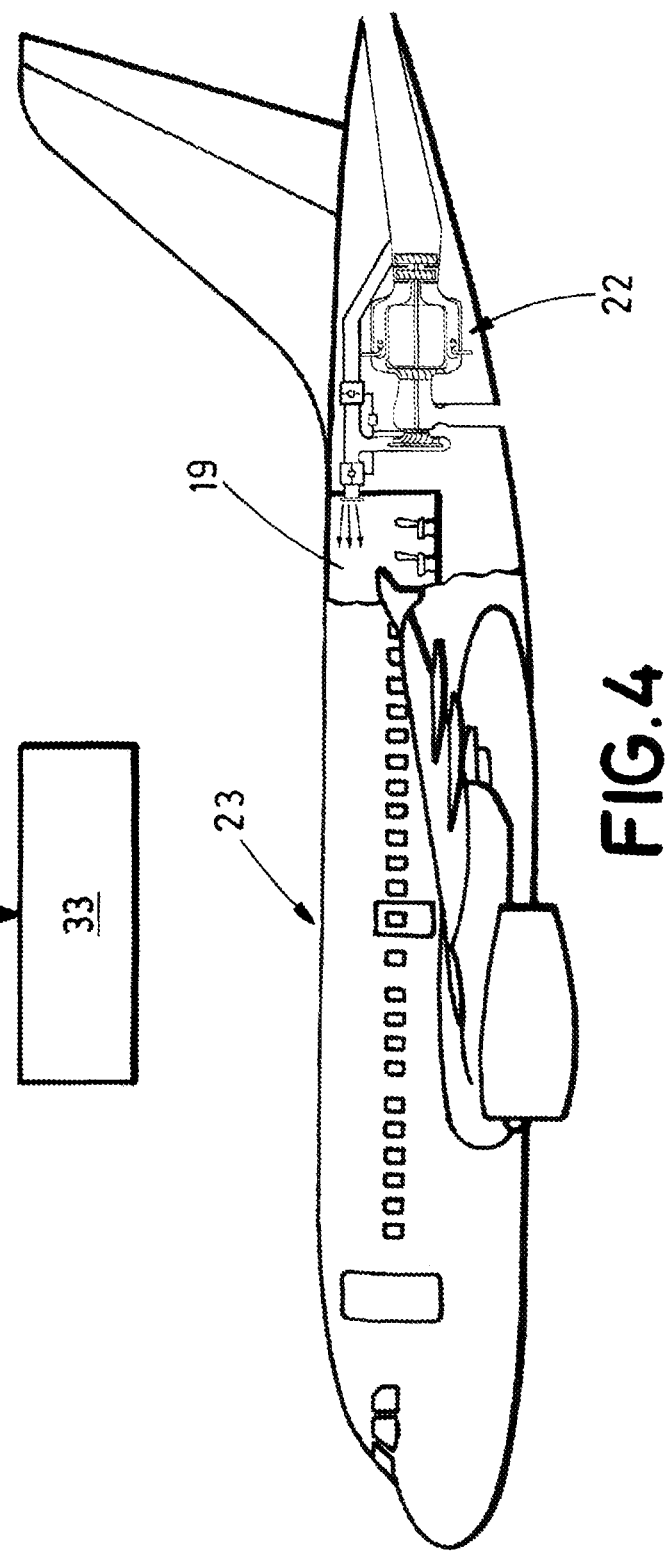

VEHICLE CABIN AIR SUPPLY DEVICE AND OPERATING METHOD OF SUCH DEVICE

CROSS-REFERENCES TO RELATED APPLICATIONS

This application claims the benefit of the European patent application No. 20382180.6 filed on Mar. 12, 2020, the entire disclosures of which are incorporated herein by way of reference.

FIELD OF THE INVENTION

The invention relates to a vehicle cabin air supply device and an operating method of such device. More particularly the invention relates to an aircraft cabin air supply device. The invention relates to the supply of fresh air to a vehicle cabin such as an aircraft cabin, while minimizing the contaminants and bad odor levels in the cabin.

BACKGROUND OF THE INVENTION

Air supplied into vehicles' cabins is often contaminated by machinery between an exterior fresh air intake and a cabin's interior volume. Indeed, in circuits between an air intake and an air mouth (outlet opening) in a vehicle cabin, dust may accumulate, oil may leak from some machinery, bearings, gears, etc. These contaminants contaminate the fresh air and are injected into the vehicle's cabin. Such contaminants create unpleasant odors for passengers in the cabin.

SUMMARY OF THE INVENTION

The invention aims to provide an air supply device and method that supply clean air to a vehicle's cabin.

The invention proposes a device and method that are simple to manufacture and to retrofit on existing vehicles.

The invention proposes an economical solution to provide clean air in a cabin.

The invention proposes an operating method of a vehicle cabin air supply device comprising:
taking a stream of fresh air from outside the cabin,
injecting the stream of fresh air into the cabin,
characterized in that it comprises a step of at least partially diverting an initial portion of the stream of fresh air to an air exhaust during an exhaust duration period before injecting a remaining portion of the stream of fresh air into the cabin.

In the whole text, the expression "fresh air" is used for air taken outside the cabin as contrasted to air already present in the cabin. The "fresh air" may be processed or modified compared to its natural state in the atmosphere before being taken in through an air intake of the invention. The air may, for example, be filtered, compressed, heated, etc. This may particularly be the case if the air has gone through a compressor stage of a turbine. For example, air extracted from a compressor stage of a turbine engine air is often called "bleed air" as it is bled from a stage of the engine stage.

The invention encompasses an operating method of a vehicle cabin air supply device comprising:
taking a stream of fresh air from outside the cabin,
injecting the stream of fresh air into the cabin,
characterized in that, when starting the air supply device, the stream of fresh air is at least partially diverted to an exhaust during an exhaust duration period.

Starting the air supply device may reflect different situations, depending on the air supply device configuration. In some embodiments, the air supply device may comprise a dedicated circulation device that is switched on upon request for fresh air in the vehicle cabin. Alternatively or in combination, the air supply device may make use of an existing circulation device on-board the vehicle, for example a circulation device ensuring another on-board function, or a turbine compressor stage on an aircraft. When the circulation device ensures another function, the starting of the air supply device may correspond to the opening of a valve, of vanes, or of a door onto an air tap to the air source provided by the circulation device. In some embodiments, starting the air supply device may correspond to the opening of a valve (or door, or tap, or vane, etc.) to supply fresh air into a fresh air circuit comprising at least one air mouth into the cabin.

During the exhaust duration period, the fresh air is exhausted outside the cabin. The fresh air channeled to the exhaust is not entering the cabin. The exhaust is configured to exhaust the fresh air in the atmosphere, back in a machine such as a turbine, or in the exhaust of another machine such as a turbine exhaust. Thereby, the invention proposes a method that avoids injecting contaminants in the cabin upon starting the air supply device. Nonetheless, in some specific embodiments, part of the fresh air may be simultaneously injected in the cabin to ensure minimum air renewal in the cabin.

After the exhaust duration period, the fresh air is injected into the cabin. Given that most of the volatile contaminants are present in the air stored in the air circuit before starting the air supply device, most air contaminants are not injected in the cabin, and ejected outside the cabin instead. Any contaminant that would be in the first stream of air circulating in the air circuit is thus not injected into the cabin, thereby reducing the amount of contaminants and sources of unpleasant odors. The air circuit between the air intake and the air exhaust may be at least partially cleared of accumulated contaminant, at least of volatized contaminants Liquid or solid contaminants accumulated on machinery and surfaces of the air supply device, such as oil in or around moving parts and dust in ducts of an air circuit for example, may also be volatized and/or ejected when a stream of fresh air is first introduced in the air circuit. Due to a method according to the invention, such contaminants are also ejected outside the cabin. After the exhaust duration period, the air circuit of an air supply device according to the invention is much cleaner than before it is started, such that the fresh air afterwards introduced in the cabin contains no or a low amount of contaminants and bad odor generating particles.

In some embodiments of a method according to the invention, when starting the air supply device, the fresh air is entirely diverted to an exhaust during an exhaust duration period.

In such embodiments, no fresh air is introduced into the cabin for an exhaust duration period after starting the air supply device. The injection of potentially contaminated air in the cabin may thus be minimized.

During the exhaust duration period, the fresh air may at least partially be circulated in an air circuit.

The air circuit beneficially comprises at least part of a cabin air supply circuit in which the fresh air circulates when it is injected in the cabin. The circulation of the fresh air in the air circuit and its ejection through an exhaust allows to remove pollutants from the air circuit.

The common portion of air circuit between an air intake and an air mouth for injecting the fresh air into the cabin and air circuit between the air intake and the exhaust for ejecting the fresh air may be maximized in order to ensure a cleaning of the longest possible portion of air circuit during the exhaust duration period and before the fresh air is injected into the cabin.

The exhaust duration period may be predetermined.

The exhaust duration period may be determined based on different factors. For example, it may be determined based on a nominal air flow upon starting the air supply device, and an amount of air stored in the air circuit of the air device. A threshold may be arbitrarily defined to determine the exhaust duration period, such as, for example, at least one and a half times the volume of the air circuit must be ejected through the air exhaust during the exhaust duration period.

The exhaust duration period may also be determined based on test results. For example, a determined amount of contaminant may be placed in an air circuit of the air supply device and the amount of contaminants may be measured to determine when a contaminant concentration is below a predetermined threshold.

The exhaust duration period value may be stored in a memory. The air supply device may comprise a memory to store such value.

Alternatively or in combination, the exhaust duration period may be calculated depending on determined criteria such as air flow, contaminants presence, air pressure, air humidity, etc. the exhaust duration period may nonetheless have a minimum threshold value.

The exhaust duration period may depend on data received from a contaminant sensor.

The contaminant sensor is configured to sense the presence of at least one air contaminant Such air contaminants may be hydrocarbons, oil, anti-fluids, particles, droplets, dust, etc. The contaminant sensor is beneficially placed in an air circuit between the air intake and the air exhaust.

The exhaust duration period may thus be configured depending on the amount of contaminant in the air circulating in the air circuit upon starting the air supply device. An air flow control device may receive contaminant data from the contaminant sensor and be configured to process such data. The air flow control device may determine an exhaust duration period at least based on the contaminant data.

The fresh air may be bled from an engine compressor stage.

For example, air for being injected in an aircraft cabin may be bled from an aircraft main or secondary engine compressor stage.

Alternatively, the fresh air may be drawn by a dedicated air circulation device.

The air supply system may have its own dedicated air circulation device to draw fresh air from outside the vehicle's cabin. Such air circulation device may nonetheless be powered by an engine having at least one other function, such as propulsion or electrical power generation. The air circulation device may, for example, be a dedicated air compressor. The compressor may have its own power source such as an electrical engine, or may be clutchable to a main or secondary aircraft engine.

The invention also extends to a vehicle air supply device comprising:
   a fresh air intake,
   an air mouth configured to inject air into a vehicle cabin,
   an air circulation device configured to circulate fresh air from the air intake to the air mouth,
   characterized in that it further comprises:
   an air exhaust for exhausting fresh air outside the cabin,
   an air flow control device configured to at least partially divert fresh air towards the air exhaust.

The fresh air intake is beneficially placed upstream from the air exhaust according to a usual direction of displacement of the vehicle.

The air supply device also comprises an air circuit for conducting fresh air between the air intake and the air mouth(s), as well as between the air intake and the air exhaust.

The air flow control device is configured to:
   at least partially divert air to circulate from the air intake to the air mouth,
   let air circulate from the air intake to the air exhaust.

More generally, the air flow control device is configured to implement an operation method of a vehicle cabin air supply device according to the invention.

The air flow control device may be configured to divert fresh air from the air intake to the air exhaust during an exhaust duration period upon starting the air supply device.

The air flow control device may be configured to divert fresh air from the air intake to the air exhaust upon starting a circulation device such as a fan, or upon opening an air tap onto a pressurized fresh air source, such as a turbine compressor stage for example.

The air flow control device may also be configured to stop the fresh air from passing through the one or more air mouths to a cabin.

A device according to the invention may further comprise a cabin valve between the air intake and the air mouth.

The air flow control device is configured to control the cabin valve. The air flow control device may partially or fully close the cabin valve during the exhaust duration period. The cabin valve is beneficially fully closed during the exhaust duration period. After the exhaust duration period, the cabin valve may at least partially be open, and may beneficially be fully open.

Also, a device according to the invention may further comprise an exhaust valve between the air intake and the exhaust.

The air supply device may comprise an exhaust valve between the air intake and the air exhaust. The air flow control device is configured to control the exhaust valve.

The exhaust valve is open during the exhaust duration period. After the exhaust duration period, the exhaust valve may at least partially be closed, and may beneficially be fully closed.

The air supply device may comprise inlet guide vanes between the air intake and the air mouth.

The inlet guide vanes are beneficially placed in an upstream portion of an air circuit of the air supply device. The inlet guide vanes may beneficially be controlled between a closed position and an open position. The air flow control device may control the inlet guide vanes. The intake of fresh air in the air circuit may thus be controlled.

The inlet guide vanes may be directly upstream an air compressor for circulating air in the air circuit.

The opening of the inlet guide vanes and/or the activating an air circulation device may be considered at the starting of the air supply device. After opening the inlet guide vanes and/or activating an air circulation device, the fresh air is exhausted through the air exhaust during an exhaust duration period.

The invention also extends to an aircraft comprising an air supply device according to an embodiment according to the invention.

The invention also extends to other possible combinations of features described in the above description and in the following description relative to the figures. In particular, the invention extends to an air supply device comprising features described in relation to the operating method; the invention extends to an operating method comprising features described in relation to the air supply device; the invention extends to aircrafts comprising features described in relation to the air supply device and/or the operating method.

BRIEF DESCRIPTION OF THE DRAWINGS

Some specific exemplary embodiments and aspects of the invention are described in the following description in reference to the accompanying figures.

FIG. 3 is a schematic representation of a method according to the invention.

FIG. 4 is a schematic representation of an aircraft according to the invention.

DETAILED DESCRIPTION OF THE PREFERRED EMBODIMENTS

Figure 1:
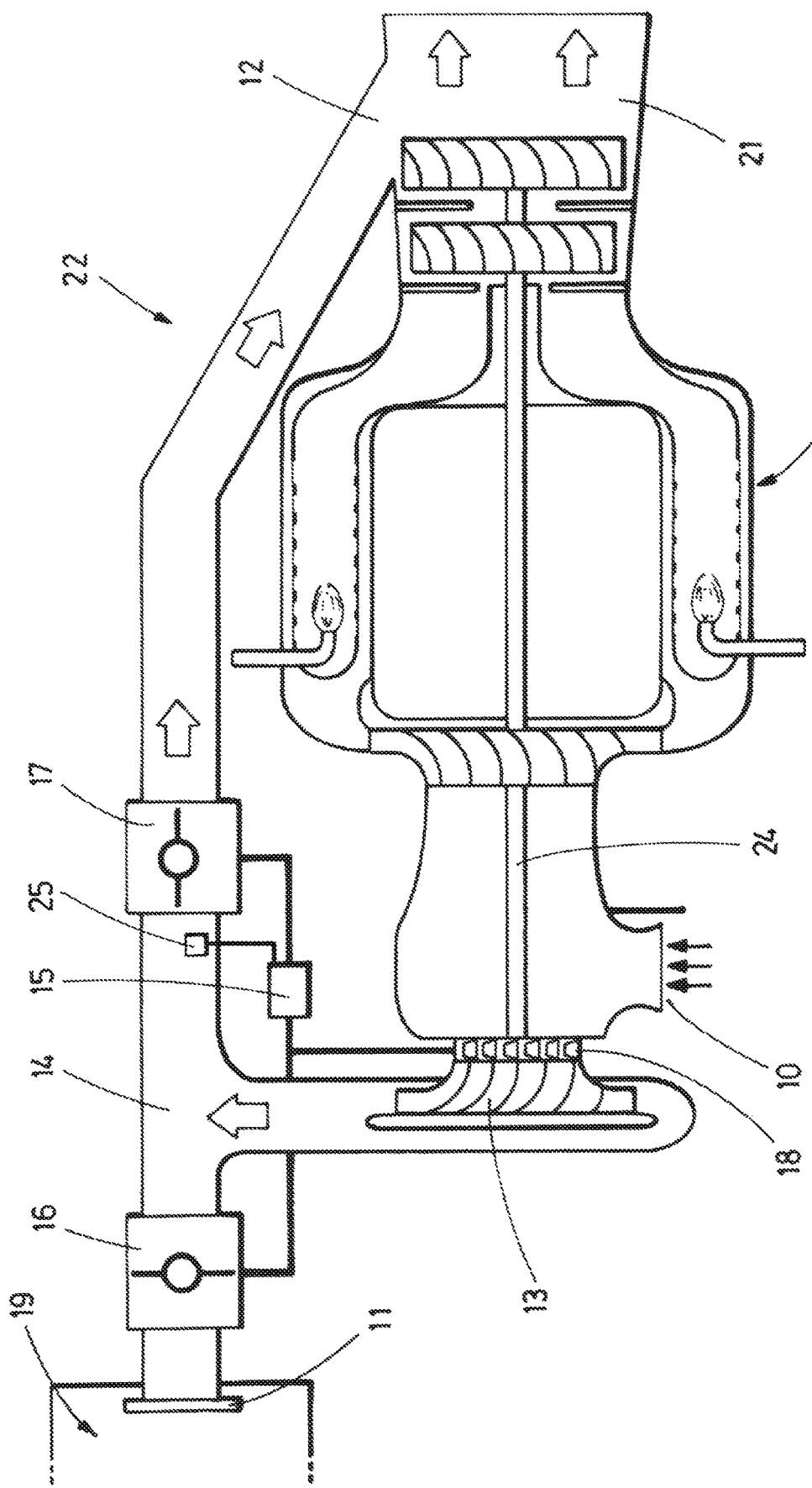
FIG. 1 is a schematic representation of a vehicle cabin air supply device according to the invention in a first operating mode.
Figure 2:
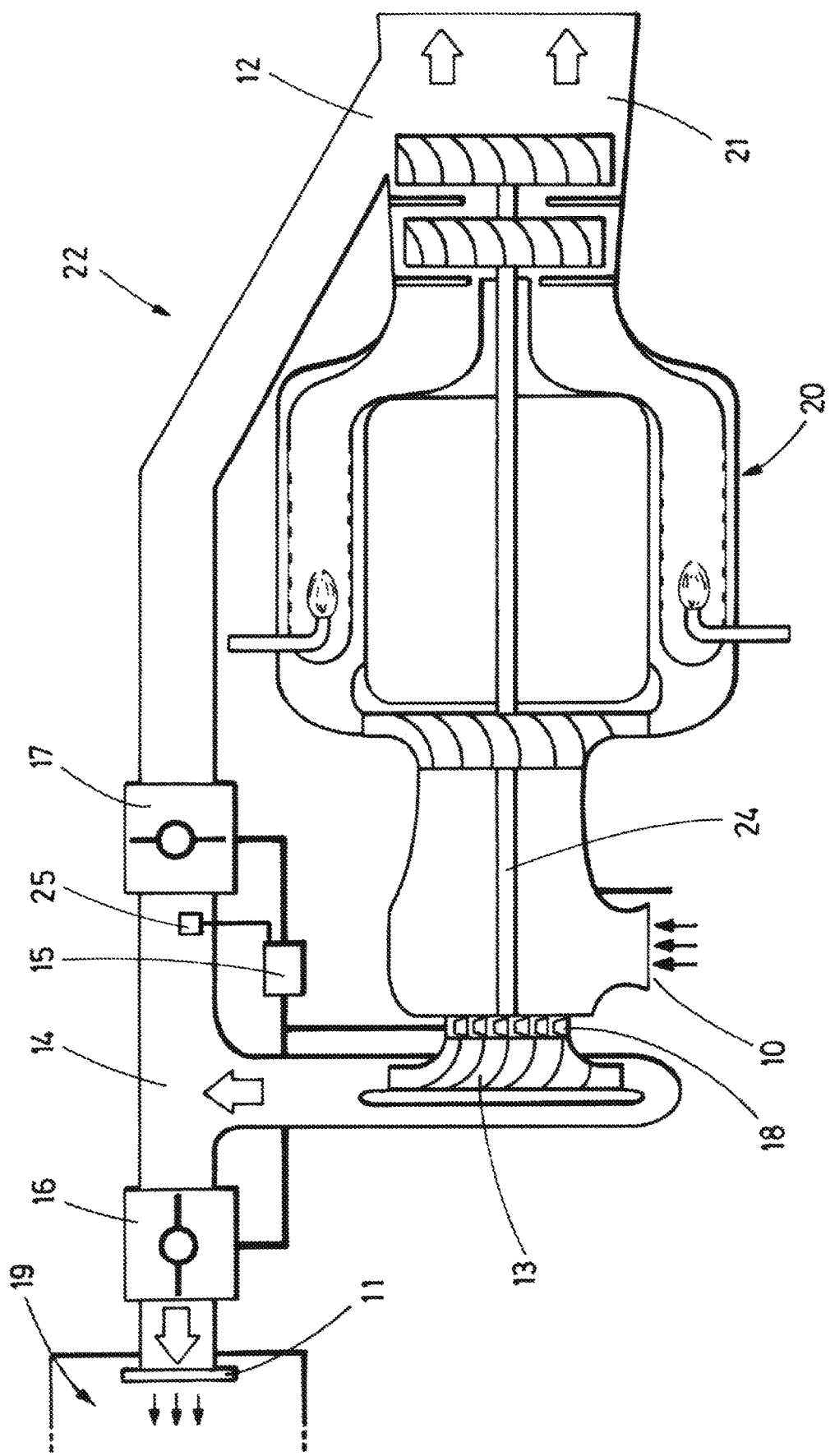
FIG. 2 is a schematic representation of the air supply device of FIG. 1, in a second operating mode.

In FIGS. 1 and 2 a vehicle cabin air supply device 22 is represented.

The air supply device 22 comprises an air intake 10 for drawing a stream of fresh air from outside the vehicle, an air mouth (outlet opening) 11 for injecting the stream of fresh air into a cabin 19, and an air exhaust 12 for ejecting the stream of fresh air towards outside the cabin, beneficially to an exterior of the vehicle, through an engine exhaust nozzle 21.

The air supply device 22 also comprises an air circuit 14 comprising a path for the air stream between the air intake 10 and the air exhaust 12 and the air mouth 11. The air supply device 22 further comprises a cabin valve 16 placed in the air circuit 14 between the air intake 10 and the cabin air mouth 11. The cabin valve 16 may be closed to impede a flow of fresh air between the air intake 10 and the air mouth 11, or open to let air flow from the air intake 10 to the air mouth 11. The air supply device 22 also comprises an exhaust valve 17 placed in the air circuit 14 between the air intake 10 and the air exhaust 12. The exhaust valve 17 may be closed to impede a flow of fresh air between the air intake 10 and the air exhaust 12, or open to let air flow from the air intake 10 to the air exhaust 12.

The cabin valve 16 and the exhaust valve 17 may be electrically controlled. The air supply device 22 comprises an air flow control device 15. The air flow control device 15 is configured to control the cabin valve 16 and the exhaust valve 17.

The air supply device 22 also comprises an air circulation device. In this embodiment the air circulation device comprises a dedicated load compressor 13 for circulating air from the air intake 10 to the air mouth 11 and/or to the air exhaust 12. The compressor 13 may be clutchable to an engine shaft 24 of an engine 20. The compressor may thus be switched on or off by clutching its shaft to the engine's shaft 24. The start of the compressor may trigger the start of the exhaust duration period.

The engine 20 may ensure additional functions such as propulsion or electrical power generation. The engine 20 may, for example, be an auxiliary power unit of an aircraft.

The air supply device 22 represented in the FIGS. 1 and 2 also comprises inlet guide vanes 18. The inlet guide vanes 18 are placed upstream from the compressor 13. The inlet guide vanes 18 may be controlled by the air flow control device 15. The inlet guide vanes 18 may be closed when no fresh air is requested in the cabin. The inlet guide vanes aperture may correspond to the start of the air supply device from which an exhaust duration period is triggered.

The air supply device 22 may also comprise a contaminant sensor 25. The contaminant sensor 25 may be placed in a portion of the air circuit 14 between the air intake 10 and the air exhaust 12, in which fresh air circulates during the exhaust duration period. Thus, the amount of air contaminant in the air exhausted through the air exhaust 12 may be measured. The exhaust duration period may be interrupted upon detection of a concentration of contaminants below a predetermined level. The contaminant sensor 25 may be connected to the flow control device 15 so as to supply its data to the flow control device 15.

FIG. 3 represents a method of operation of an air supply device 22 according to the invention. In a first step 31, the air supply device 22 is started. Upon starting the air supply device 22—in particular upon switching on the air circulation device 13 and/or opening the inlet guide vanes 18—the exhaust duration period is triggered.

In a second step 32, the fresh air drawn from outside the vehicle is exhausted after having circulated in the air circuit 14, without having been injected into the cabin 19 at any moment. The air flow control device 15 is configured to open the exhaust valve 17 and close the cabin valve 16 during the exhaust duration period. The fresh air drawn through the air intake 10 is thus exhausted through the exhaust 12 after having circulated in the air circuit 14, as represented by arrows on FIG. 1. The fresh air thus cleans the air circuit 14 of any accumulated contaminant such as dust, oil and other volatile components that are susceptible of creating a bad odor sensation.

In a third step 33, the fresh air is injected into the cabin 19. After the exhaust duration period, the air flow control device 15 closes the exhaust valve 17 and opens the cabin valve 16 such that clean fresh air drawn from outside the vehicle may be injected into the cabin 19 through one or more mouth(s) 11. The flow of air in such configuration is shown by arrows in FIG. 2.

The flow control device 15 may be a controller or a computer. The air flow control device 15 may comprise a memory to store an exhaust duration period value and/or an algorithm to determine the exhaust duration period.

The air flow control device 15 may receive contaminant data from the contaminant sensor 25 to determine an exhaust duration period.

The exhaust duration period may be determined based on tests, taking into account that in configurations similar to that presented in FIGS. 1 and 2, the highest amount of contaminants is present in the first portion of the air circuit 14.

The flow control device 15 may operate other functions such as a control of the engine 20. The flow control device 15 may be connected to a central computer or to a control board for pilots or flight attendants, such that that fresh air may be delivered in the cabin upon request.

In FIG. 4, an aircraft 23 according to the invention is represented, which comprises a cabin 19 and a cabin air supply device 22 according to the invention. The air supply device 22 may be powered by an auxiliary power unit (APU) of the aircraft.

The invention is not limited to the specific embodiments herein disclosed as examples. The invention also encompasses other embodiments not herein explicitly described, which may comprise various combinations of the features herein described.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An operating method of an air supply device for a vehicle cabin comprising:
    taking a stream of fresh air from outside the cabin via an auxiliary power unit, wherein the stream of fresh air is defined as air taken from outside the cabin that has not passed though the cabin,
    injecting said stream of fresh air into the cabin,
    at least partially diverting an initial portion of the stream of fresh air to an air exhaust nozzle in the auxiliary power unit during an exhaust duration period before injecting a remaining portion of said stream of fresh air into the cabin.

2. The method according to claim 1, further comprising when starting the air supply device, the stream of fresh air is entirely diverted to the air exhaust during the exhaust duration period.

3. The method according to claim 1, further comprising that during the exhaust duration period, said stream of fresh air is at least partially circulated in an air circuit.

4. The method according to claim 1, further comprising that said exhaust duration period is predetermined.

5. The method according to claim 1, further comprising that a length of said exhaust duration period is based on data received from a contaminant sensor.

6. The method according to claim 1, further comprising that the stream of fresh air is bled from a compressor stage of the auxiliary power unit.

7. The method according to claim 1, further comprising that the stream of fresh air is drawn by a dedicated air circulation device.

8. A vehicle cabin air supply device comprising:
    auxiliary power unit comprising a fresh air intake,
    an air mouth in fluid communication with the fresh air intake, the air mouth configured to inject air into a vehicle cabin,
    an air circulation device configured to circulate a stream of fresh air from the fresh air intake to the air mouth, wherein the stream of fresh air is defined as air taken from outside the cabin that has not passed though the cabin,
    an air exhaust nozzle in the auxiliary power unit for exhausting fresh air outside the vehicle cabin air supply device,
    an air flow control device configured to at least partially divert the stream of fresh air towards the air exhaust nozzle in the auxiliary power unit.

9. The vehicle cabin air supply device according to claim 8, further comprising that the air flow control device is configured to divert the stream of fresh air from the fresh air intake to the air exhaust nozzle during an exhaust duration period upon starting the air supply device.

10. The vehicle cabin air supply device according to claim 8, further comprising a cabin valve positioned in a path of the stream of fresh air extending between the fresh air intake and the air mouth.

11. The vehicle cabin air supply device according to claim 8, further comprising an exhaust valve positioned in a path of the stream of fresh air extending between the fresh air intake and the air exhaust nozzle.

12. The vehicle cabin air supply device according to claim 8, further comprising inlet guide vanes positioned in a path of the stream of fresh air extending between the fresh air intake and the air mouth.

13. An aircraft comprising a vehicle cabin air supply device according to claim 8.

* * * * *